US006766927B1

(12) United States Patent
Cart

(10) Patent No.: US 6,766,927 B1
(45) Date of Patent: Jul. 27, 2004

(54) VEHICLE GUN HOLDER

(76) Inventor: Bruce A. Cart, 122 Karolwood Dr., Lafayette, LA (US) 70503

( * ) Notice: Subject to any disclaimer, the term of this patent is extended or adjusted under 35 U.S.C. 154(b) by 63 days.

(21) Appl. No.: 10/146,838

(22) Filed: May 15, 2002

(51) Int. Cl.[7] .................................................. B60R 7/14
(52) U.S. Cl. ........................ 224/275; 224/539; 224/571; 224/913; 206/317
(58) Field of Search ................................ 224/913, 572, 224/571, 563, 549, 539, 541, 275, 401, 402; 383/907, 2; 296/37.1, 37.8, 37.15; 206/317; 42/106

(56) References Cited

U.S. PATENT DOCUMENTS

| | | | | |
|---|---|---|---|---|
| 2,574,730 A | * | 11/1951 | Crew et al. ................. | 224/913 |
| 3,142,424 A | * | 7/1964 | Reed, Jr. ..................... | 224/913 |
| 3,295,887 A | * | 1/1967 | Bacon ...................... | 297/188.2 |
| 3,430,841 A | * | 3/1969 | Kanaga ....................... | 383/907 |
| 4,369,904 A | * | 1/1983 | Christensen ................ | 224/913 |
| 4,530,178 A | * | 7/1985 | Rauscher ........................ | 43/26 |
| 4,877,131 A | * | 10/1989 | Patros et al. ................. | 224/913 |
| 5,503,477 A | * | 4/1996 | Schlough .................... | 383/907 |
| 5,833,102 A | * | 11/1998 | Jacobson .................... | 224/913 |
| 5,875,580 A | * | 3/1999 | Hill et al. ...................... | 42/94 |
| 5,938,336 A | * | 8/1999 | King ............................. | 383/4 |
| 6,206,261 B1 | * | 3/2001 | McCrary .................... | 224/913 |
| 6,279,799 B1 | * | 8/2001 | Horton ....................... | 224/913 |

* cited by examiner

Primary Examiner—Nathan J. Newhouse
(74) Attorney, Agent, or Firm—Joseph L. Lemoine, Jr.; Jesse D. Lambert

(57) ABSTRACT

A gun holder for use in vehicles comprises a pair of elongated bendable sidewalls having upper and lower portions. The upper portions of the sidewalls are joined by a strip of flexible material. The cross-sectional shape of the sidewalls forms generally a "V" shape, and when the lower narrow edge of the V is inserted into a seating gap in a vehicle seat, an open, upwardly facing pocket is formed by the flexible sheet material and the sidewalls. A gun may then be inserted into the pocket, and is securely held there for increased safety and protection of the gun, while still permitting very rapid access to the gun when desired.

11 Claims, 9 Drawing Sheets

United States Patent

VEHICLE GUN HOLDER

BACKGROUND

1. Field of Art

This invention relates generally to apparatus for holding firearms in a secure, yet readily available location inside or on a vehicle. With further specificity, this invention is a gun holder which lends itself to being used in a variety of vehicles, and which holds a gun in a position which may be easily accessed by the driver or passenger of the vehicle and therefore rapidly put into use.

2. Related Art

Guns of almost any type represent a significant investment and may otherwise hold great value to the owner/user, for sentimental reasons and the like. It behooves the owner/user to maintain guns in good condition, both mechanically and cosmetically. As a result, many different types of gun "cases" have been used over the years, ranging from "soft" cases to trunk-like "hard" cases. Soft cases are typically some sort of sleeve (usually of outer fabric or leather) with a padded interior. Access to the interior of the soft case is often with a zipper or hook and loop fastener, or other well known means. Hard cases may be made of metal such as aluminum, wood, or various plastics. Usually, hard cases are hinged, luggage-fashion, with foam inserts or the like inside to conform to the shape of the gun.

Another type of hard case is shaped more like a scabbard, with the gun inserted into an opening at one longitudinal end.

While the above-described cases generally satisfactorily protect guns, most of them do not provide very quick access to the gun. By design, in order to increase protection and/or security, openings of different sorts must be accessed to get the gun out.

In certain situations, it is desired to maintain a gun in a readily accessible position inside or on a vehicle, yet still maintain a high degree of protection for the gun. One example is a mode of big game (for example, deer) hunting popular in a number of areas, which involves driving a vehicle (such as a pickup truck or SUV) down roads in game populated areas in order to sight game animals. Once a game animal is sighted, the vehicle is stopped, the hunter gets his or her gun into position (shooting either from within or without the vehicle) and the shot is taken. It will be appreciated that the elapsed time from sighting the animal until the shot must be taken must be short, or usually the animal will become spooked and leave the scene. In order to minimize time, the gun is often loaded, with ammunition in the magazine if not chambered; and the gun must obviously be in an accessible location.

In addition to sport hunters, other gun users have a need for secure, but ready access, holding of guns in or on vehicles. For example, farmers and ranchers often carry a gun to use for pest and varmint control, and law enforcement officers frequently have a need for holding firearms in a ready position inside their vehicles.

In these situations, a frequent way of carrying the gun, for a passenger, is to physically hold it with the muzzle pointing either straight up or angled down at the floorboard of the vehicle. The driver, however, must generally have both hands available for driving, therefore a typical practice has been to keep the gun simply muzzle-down on the floorboard, with the end of the barrel on the floorboard, and the mid-section of the gun resting on the seat. The grip and butt of the gun are therefore readily accessible. But this practice has numerous drawbacks. Since the gun is not really held in place by any restraints, safety is compromised as the gun can slide around, the muzzle potentially point at the driver or a passenger's foot or leg, etc.; and the gun itself, or in the case of a scoped rifle, the telescopic sight, can be cosmetically or functionally damaged by banging against the interior of the vehicle.

While certain gun holders have been devised to hold guns in or on vehicles, generally such holders are of a rigid metal or plastic composite construction and must be semi-permanently or permanently installed in the vehicle. Such holders do not readily lend themselves to being taken from one vehicle into another. Many prior art design holders also do not provide complete protection for the gun, as most of the length of the gun is not covered, but is exposed and subject to scratching, etc. Examples of prior art holders include U.S. Pat. No. 6,293,447 to Jorgensen. Another limitation of gun holders such as that in U.S. Pat. No. 6,293,447 is that they make access to the center console storage compartment (most center consoles having a hinged lid, as shown in the Jorgensen reference) difficult or impossible with the gun holder in place, and particularly with a gun in place in the holder.

These problems give rise to the need for a gun holder which keeps a gun at a readily accessible position within the vehicle, for easy access by occupants of the vehicle; yet at the same time restrains the gun in place so as to increase safety and protect against damage, and in addition covers substantially all of the length of the gun. In addition, it is desired to have such a gun holder which is adapted to use in many different vehicles without customization to each, and which is of simple and inexpensive construction.

SUMMARY OF THE INVENTION

This invention is a gun holder with generally resilient bendable sidewalls forming a tapering cross-sectional or "V" shape, the lower narrow or apex portion which may be inserted into and preferably wedged into a seating space gap, which may be the space between bucket seats of a vehicle or the gap between the sections of split bench seats. The upper portions of the sidewalls may be spaced apart and support a strip of flexible sheet material between them, forming an open pocket into which a gun may be cradled, which may be padded for increased protection of the gun. The bendable sidewalls permit the gun holder to be wedged into the available seating space gap, with the tapering aspect of the cross sectional shape accommodating varying sizes of spaces, and be securely held in place by friction. A secure base for supporting the upper pocket is formed, and the gun is held in a ready position for easy access by the driver or a passenger. At the same time, most of the length of the gun is largely covered and protected from scratches, etc.

BRIEF DESCRIPTION OF THE DRAWINGS

FIGS. 9a–9c are drawings of one embodiment of the gun holder, in a flattened position, as an intermediate step in

DESCRIPTION OF THE PRESENTLY PREFERRED EMBODIMENT

The present invention lends itself to fabrication in a number of different embodiments. While many variations are possible within the scope of the invention, with reference to the drawings one presently preferred embodiment will be described.

Figure 1:
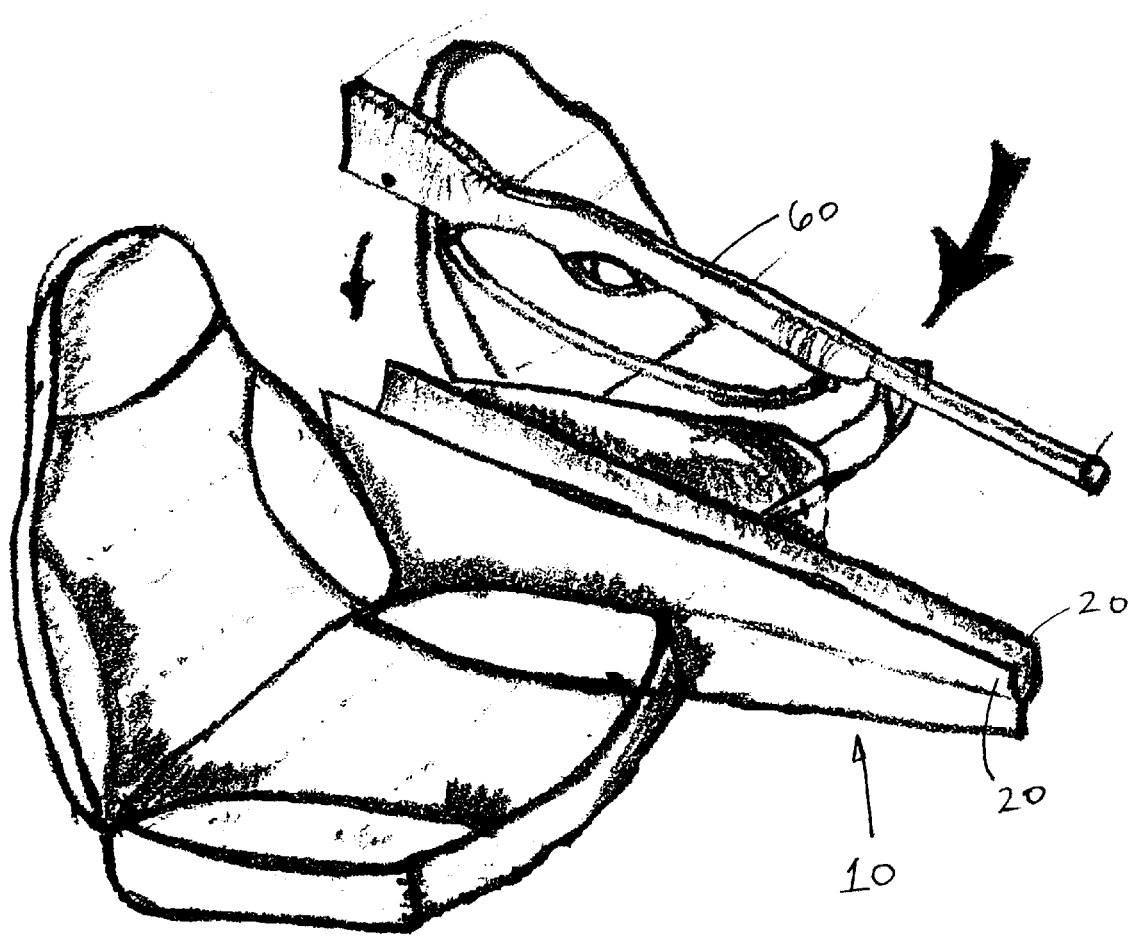
FIG. 1 is a perspective view of the invention, in place in a vehicle, with a gun being positioned in the holder.

FIG. 1 is a representative overall view showing the gun holder 10 placed in position in a seating space gap. In FIG. 1, the seating space gap is between one bucket seat and the adjacent center console, but it is understood that bucket seats adjacent one another, or split bench seats (front or rear) also provide a readily usable seating space gap. FIG. 1 further shows a gun being lowered (in the direction of the arrows) into place in the holder, as will be described in further detail. It is to be further understood that while the following description particularly applies to placement of the gun holder inside of a vehicle such as a pickup truck or SUV, the holder could also be used on different types of ATVs, and the scope of the invention is therefore not limited to use in any particular type of vehicle. Further, the gun holder can be used not only for long guns, such as rifles and shotguns, but also for handguns.

Figure 2:
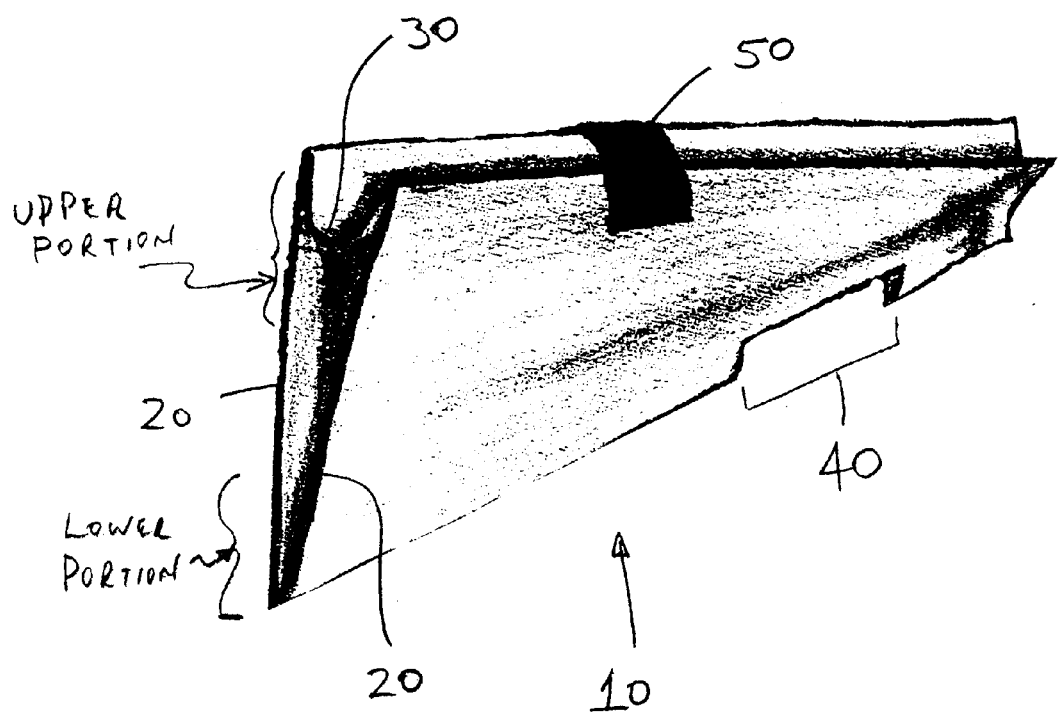
FIGS. 2 and 3 are two perspective views of the gun holder.
Figure 3:
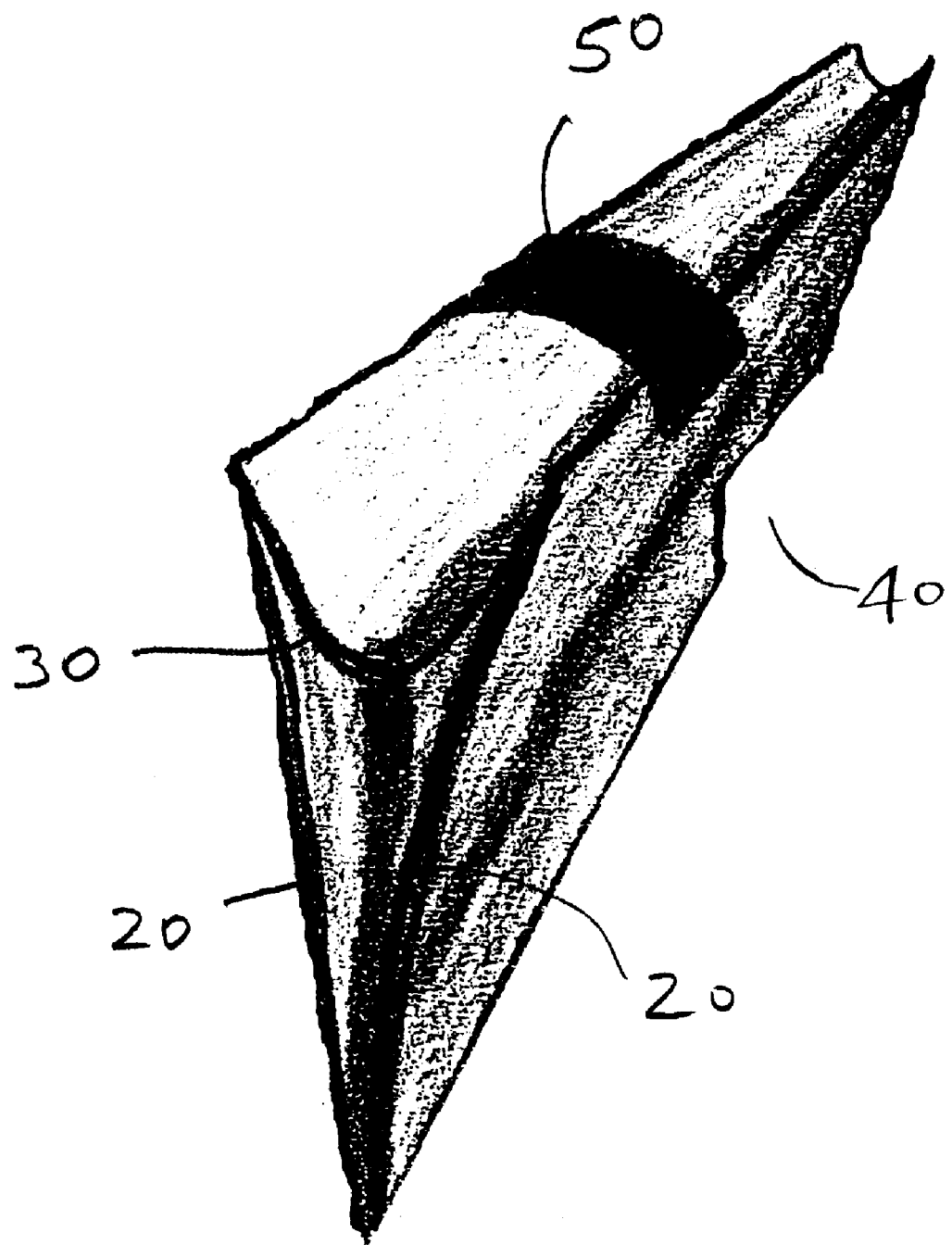

FIGS. 2 and 3 are two isometric views of gun holder 10. Gun holder 10 comprises a pair of elongated bendable sidewalls 20 disposed adjacent one another. A strip of flexible material 30 joins the upper portions of the sidewalls. It can be seen that sidewalls 20 generally form a V shape, with the apex of the V formed by the lower portions of sidewalls 20, the sidewalls opening upwardly to form the separated space. Flexible material 30, attached to and supported by the upper portions of sidewalls 20, forms an upwardly facing open pocket into which a gun can be placed, as can be readily seen in FIG. 1 and FIGS. 5–8. A cutaway 40 may be made in the lower portions of sidewalls 20 in order to accommodate the contour of the floor or other structure of the vehicle against which sidewalls 20 may rest, and to enable gun holder 10 to rest more securely in place.

While the drawings show that flexible material 30 forms a pocket having a relatively straight bottom profile, the gun holder can be made such that the pocket formed by flexible material 30 has a profile which closely accommodates the profile of a typical rifle or shotgun, that is matches the barrel, forearm, pistol grip, buttstock, etc. Different models may be made for different configurations of guns, if desired.

In one preferred embodiment, a strap 50 may span the pocket formed by flexible material 30 and connect the sidewalls one to the other. Strap 50 is preferably releasable from sidewalls 20 on at least one end via a hook and loop fastener, buckle, or other fastener well known in the art.

Figure 4:
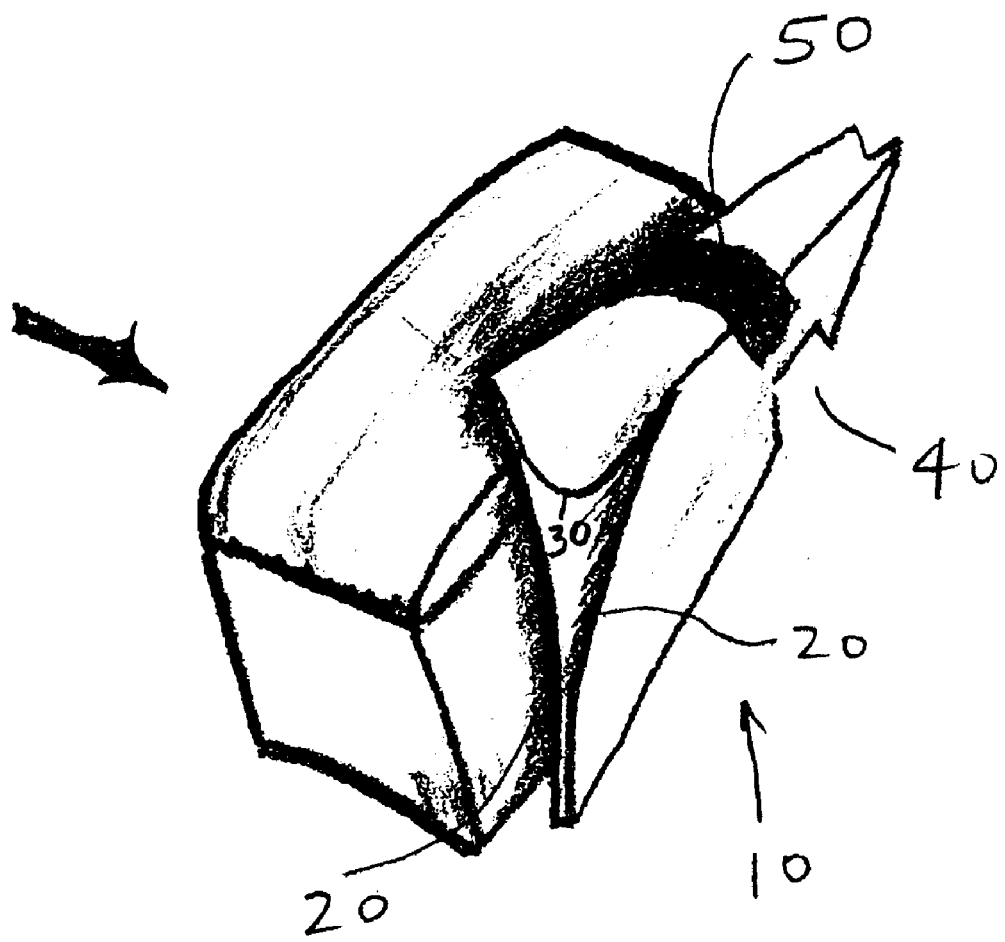
FIG. 4 is a view of the gun holder wedged into place in a vehicle (with one side of the seat omitted for clarity).
Figure 5:
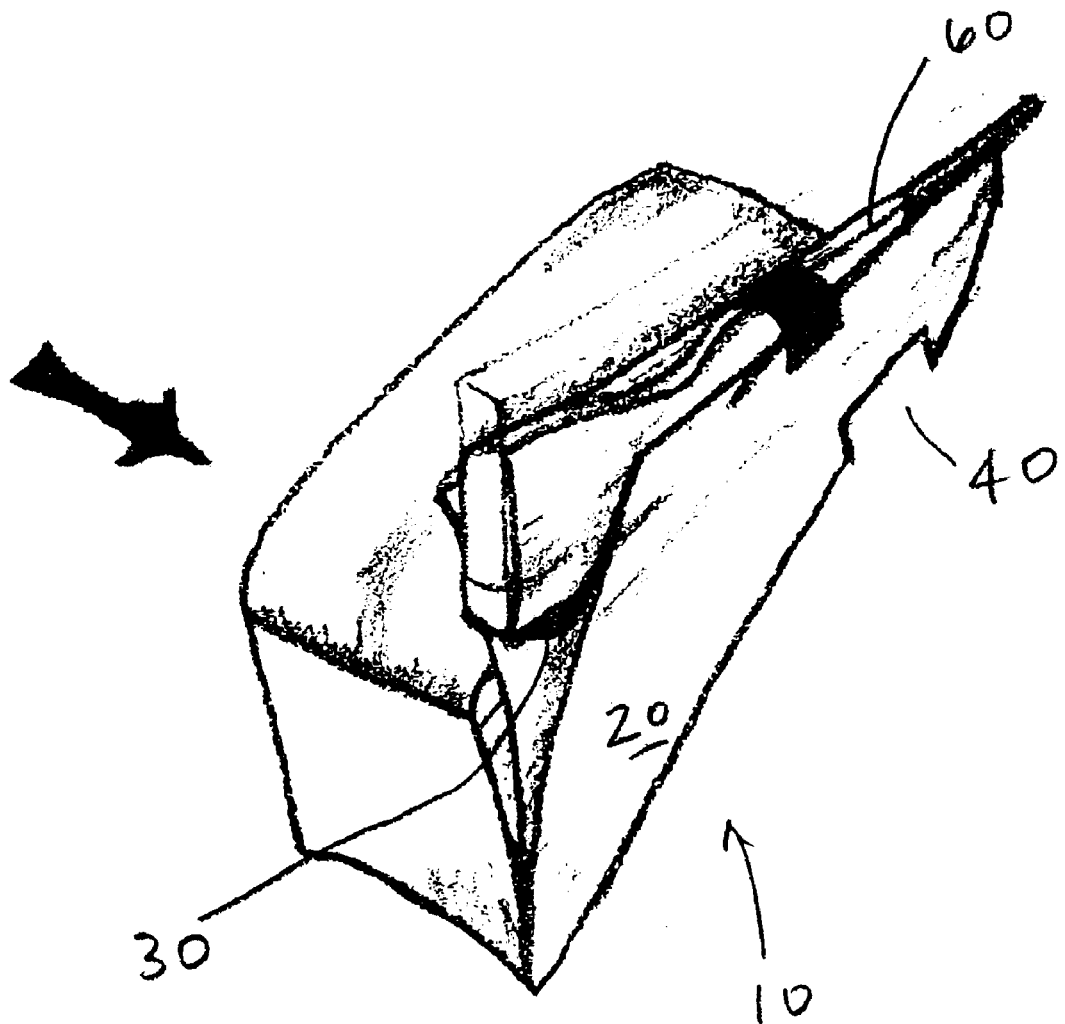
FIG. 5 shows a gun inserted into the holder as pictured in FIG. 4.

To use the invention, gun holder 10 is generally first wedged into a seating space gap, as shown in FIG. 4 (with one side of the seat omitted for clarity). Gun holder 10 can be pushed downward until the lower edge of sidewalls 20 rest on the floor of the vehicle, or until the increasing width of the taper of sidewalls 20 permits no further insertion. Gun 60 is then inserted into the pocket formed by flexible material 30, as shown in FIG. 5. Strap 50 can be used as needed to more securely hold gun 60 in place in the pocket. It can be seen that gun 60 is cradled in the flexible material and/or by the upper portions of sidewalls 20 and protected therein. Yet another attribute of the present gun holder is apparent from the drawings, in that access to the center console storage compartment is largely preserved, since the holder does not cover the center console lid to a significant degree.

Figure 6:
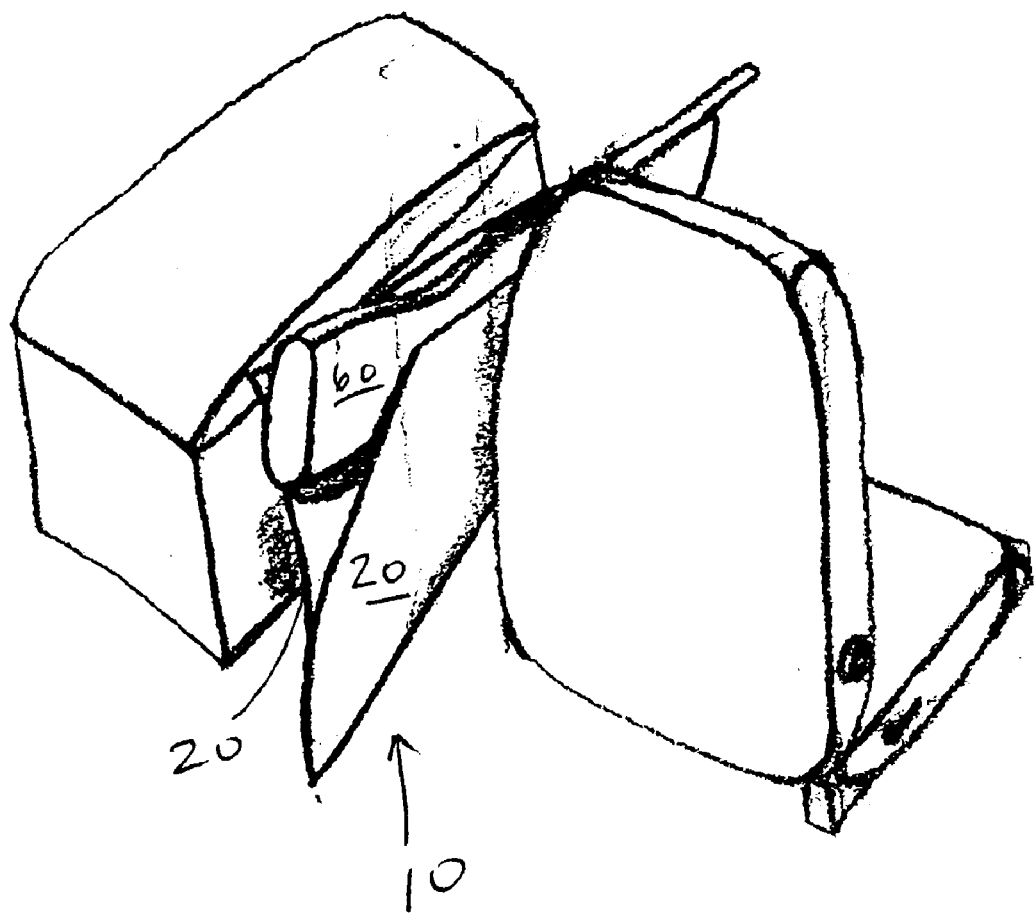
FIGS. 6, 7, and 8 are different views of the gun holder, in place in different seat arrangements inside of a vehicle.
Figure 7:
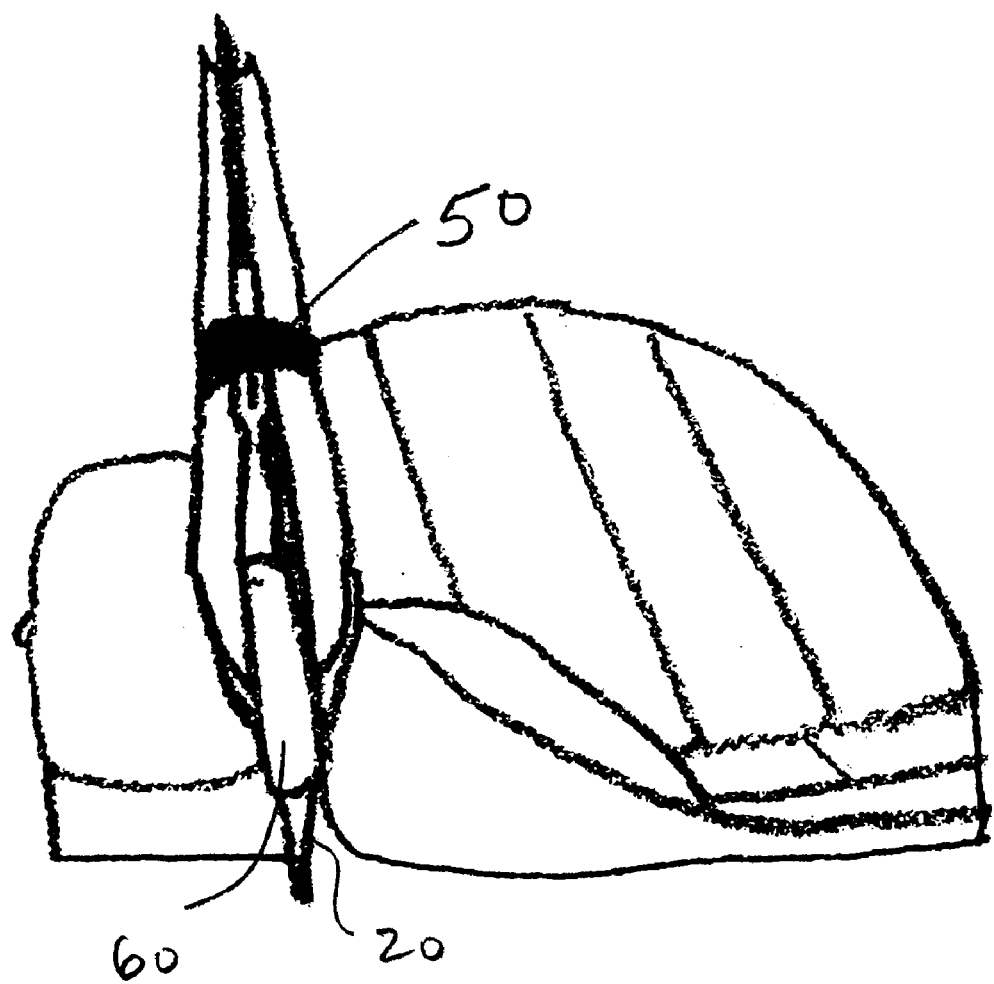
Figure 8:
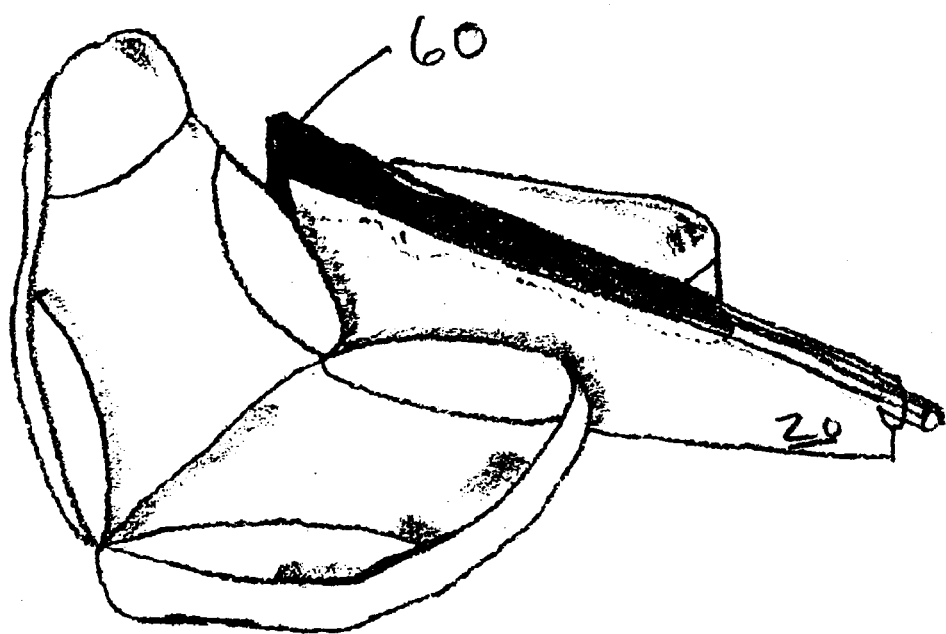

FIGS. 6, 7, and 8 show alternative examples of use of gun holder 10. FIGS. 6 and 7 show a typical use with gun holder 10 wedged between a bucket seat and a console. FIG. 8 is another view with gun holder 10 wedged between a bucket seat and a console and a gun in place.

Different materials may be used to make the gun holder of the present invention. One example of satisfactory material for the sidewalls is sheet plastic, in a semi-rigid yet still bendable form. It is understood that other materials, including sheet metals, thin wood, etc. could be used as well. It is desirable to have a bendable material for the sidewalls so that they can be wedged into place in a seating space gap, yet the upper portions spread apart (by resiliently bending the sidewalls) sufficiently to insert a gun into the holder, where the resilience of the sidewalls tends to squeeze against the gun and hold it in place. Flexible material 30 may be a sheet plastic, fabric of natural or synthetic materials, leather, or other similar material. Preferably, flexible material 30 is smooth and non-abrasive to provide protection for the gun. Padding may be added if desired.

Figure 9A:
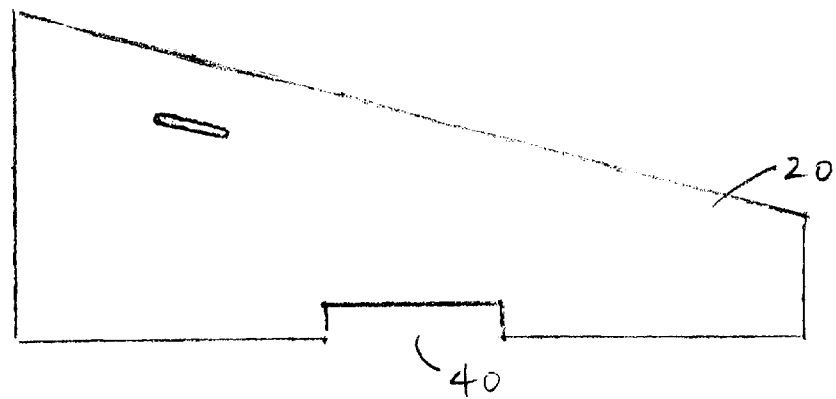
Figure 9B:
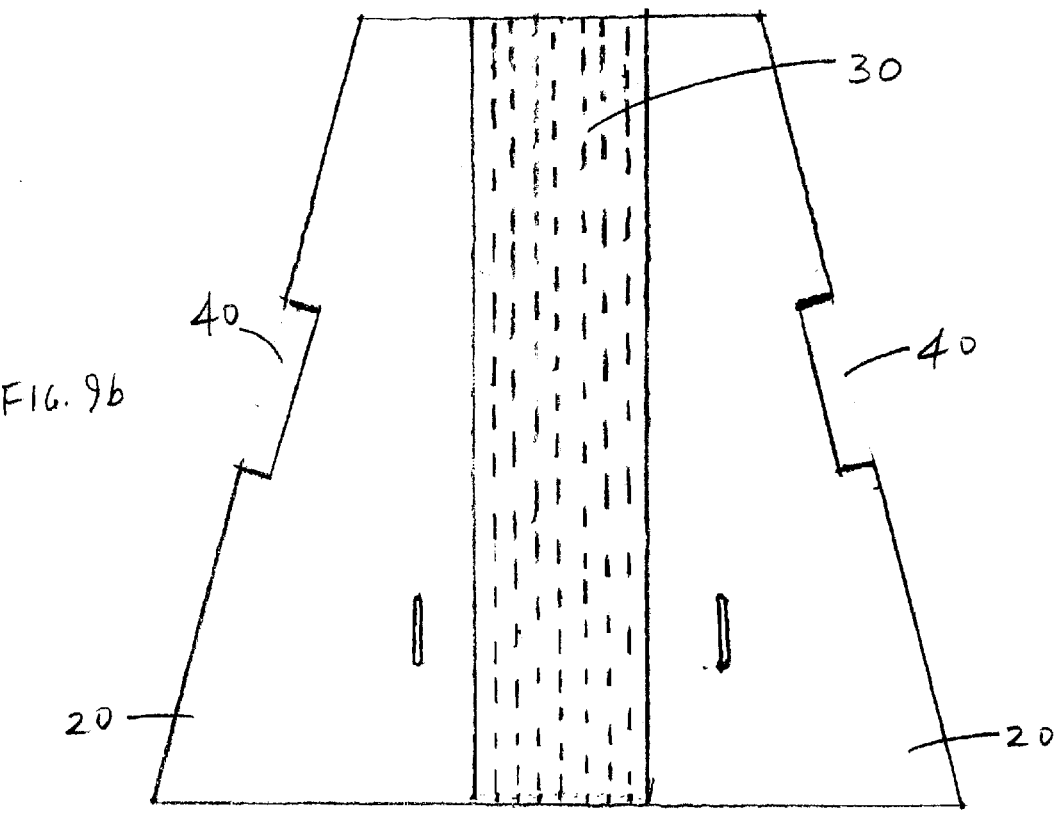
Figure 9C:
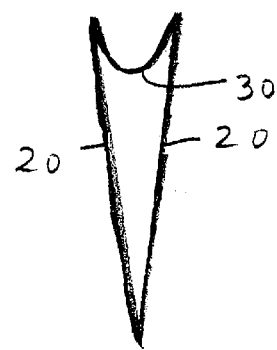

Different manners of fabrication of the gun holder are possible. The sidewalls may be a single piece, joined at the lower portion or edge and folded so as to create the two opposed sidewalls and the flexible material attached to and joining the upper portions thereof. Another method of fabrication is illustrated in FIG. 9a, where sidewalls 20 can be stamped or cut out of flat sheet material, then joined by the strip of flexible material 30 (for example, by sewing, use of adhesives, etc.). The holder can then be folded to the desired shape shown in FIG. 9b (which is an end view) and FIG. 9c (which is a side view). An advantage of this method of manufacture is that it forms a gun holder which when not in use can be readily folded flat and stored.

Although the description above contains many specificities, same are presented by way of example only and not limitation. Many variations in the invention can be made while not departing from the scope thereof. For example, the particular elongated shape of the sidewalls (including the cutaways) can be modified to accommodate a desired vehicle, or gun (for example, guns with or without scopes); the size of the gun holder may be modified to fit different guns and vehicles; different materials can be used for the sidewalls and the flexible material forming the pocket into which the gun fits; and different methods of manufacture may be used. Padding may be added if desired to increase the protection afforded the gun. Different strap arrangements and fastening thereof can be used. The gun holder can be used in or on any vehicle which has a space into which the lower, narrow end of the sidewalls can be wedged for secure holding. A shorter version of the gun holder can be made to specifically accommodate handguns.

Therefore, the scope of the invention is not to be limited to the above description, but by the scope of the appended claims and their legal equivalents.

I claim:

1. A vehicle gun holder, comprising:
    a) a pair of elongated bendable side walls, each having an upper and a lower portion;
    b) a strip of flexible sheet material joining the upper portion of each elongated side wall, one to the other,
    whereby when said sidewalls are substantially aligned with one another and said lower portions of said sidewalls are inserted side-by-side into a vehicle seating space gap, an open pocket is formed by said flexible sheet material and between said elongated bendable side walls into which a gun may be placed, and wherein said side walls are fabricated from a semi-rigid material having sufficient strength and rigidity to support the weight of a gun placed into said open pocket.

2. The gun holder of claim 1, further comprising a strap attached to said sidewalls and spanning the distance across said pocket.

3. The gun holder of claim 1, wherein said sidewalls are formed of a semi-rigid plastic sheet material.

4. A vehicle gun holder, comprising:

a) a pair of elongated bendable side walls, each having an upper and a lower portion;

b) a strip of flexible sheet material joining the upper portion of each elongated side wall, one to the other, whereby when said sidewalls are substantially aligned with one another and said lower portions of said sidewalls are inserted side-by-side into a vehicle seating space gap, an open pocket is formed by said flexible sheet material and said elongated bendable side walls into which a gun may be placed, and further comprising a cutaway forming a contour in the lower portions of said sidewalls, said contour adapted to accommodate a contour of a structure of said vehicle; and c) a strap attached to said sidewalls across said pocket.

5. The gun holder of claim 4, wherein said sidewalls are formed of a semi-rigid plastic sheet material.

6. A vehicle gun holder adapted to use in the seating area of the vehicle, comprising:

a) a pair of elongated opposed side walls, each having an upper and a lower portion, said side walls formed of a bendable sheet material, and having a length sufficient to accommodate a gun therebetween;

b) a strip of flexible sheet material joining the upper portion of each elongated side wall, one to the other, whereby when said elongated sidewalls are substantially aligned with one another and said lower portions of said sidewalls are inserted side-by-side into a vehicle seating space gap, said upper portions of said sidewalls may be separated and an upwardly facing open pocket formed by said flexible sheet material and said elongated bendable side walls, said open pocket having a size and shape to cradle substantially all of a gun therein, and wherein said side walls are fabricated from a semi-rigid material having sufficient strength and rigidity to support the weight of a gun placed into said open pocket.

7. The gun holder of claim 6, further comprising a strap across said open pocket, said strap fastened to said side walls on at least one end by a hook-and-loop fastener.

8. The gun holder of claim 6, wherein said flexible sheet material forms a pocket having a profile substantially matching the profile of a gun carried therein.

9. The gun holder of claim 6, wherein said gun holder is dimensioned and shaped to accommodate a handgun.

10. A vehicle gun holder adapted to use in the seating area of the vehicle, comprising:

a) a pair of elongated opposed side walls, each having an upper and a lower portion, said side walls formed of a bendable sheet material, and having a length sufficient to accommodate a gun therebetween, and wherein said lower portion of said side walls comprise a cutaway contoured to accommodate a contour of a structure of a vehicle;

b) a strip of flexible sheet material joining the upper portion of each elongated side wall, one to the other, whereby when said elongated sidewalls are substantially aligned with one another and said lower portions of said sidewalls are inserted side-by-side into a vehicle seating space gap, said upper portions of said sidewalls may be separated and an upwardly facing open pocket formed by said flexible sheet material and said elongated bendable side walls, said open pocket having a size and shape to cradle substantially all of a gun therein.

11. The gun holder of claim 10, further comprising a strap across said open pocket, said strap fastened to said side walls on at least one end by a hook-and-loop fastener.

* * * * *